United States Patent
Shin et al.

(10) Patent No.: US 11,600,863 B2
(45) Date of Patent: Mar. 7, 2023

(54) METHOD OF MANUFACTURING LITHIUM SECONDARY BATTERY WITH GEL POLYMER ELECTROLYTE

(71) Applicant: LG CHEM, LTD., Seoul (KR)

(72) Inventors: Won Kyung Shin, Daejeon (KR); Kyoung Ho Ahn, Daejeon (KR); Jae Won Lee, Daejeon (KR); Chui Haeng Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 342 days.

(21) Appl. No.: 16/771,133

(22) PCT Filed: May 31, 2019

(86) PCT No.: PCT/KR2019/006570
§ 371 (c)(1),
(2) Date: Jun. 9, 2020

(87) PCT Pub. No.: WO2019/231277
PCT Pub. Date: Dec. 5, 2019

(65) Prior Publication Data
US 2021/0175537 A1     Jun. 10, 2021

(30) Foreign Application Priority Data
May 31, 2018   (KR) .................. 10-2018-0062561

(51) Int. Cl.
*H01M 10/058*   (2010.01)
*H01M 10/0525*  (2010.01)
(Continued)

(52) U.S. Cl.
CPC ..... *H01M 10/058* (2013.01); *H01M 10/0525* (2013.01); *H01M 10/0565* (2013.01); *H05B 6/105* (2013.01)

(58) Field of Classification Search
CPC .......... H01M 10/058; H01M 10/0525; H01M 10/0565; H01M 2300/0082;
(Continued)

(56) References Cited

U.S. PATENT DOCUMENTS

| | | |
|---|---|---|
| 5,316,557 A | 5/1994 | Iwase et al. |
| 6,119,762 A | 9/2000 | Miyagi et al. |

(Continued)

FOREIGN PATENT DOCUMENTS

| | | |
|---|---|---|
| CN | 1503397 A | 6/2004 |
| CN | 101938010 A | 1/2011 |

(Continued)

OTHER PUBLICATIONS

International Search Report dated Sep. 9, 2019 issued in corresponding International Patent Application No. PCT/KR2019/006570.

(Continued)

*Primary Examiner* — Gary D Harris
(74) *Attorney, Agent, or Firm* — Morgan, Lewis & Bockius LLP

(57) ABSTRACT

The present invention provides a method for manufacturing a lithium secondary battery, the method including injecting a composition for a gel polymer electrolyte into a lithium secondary battery case having an electrode assembly including a metal electrode current collector and then sealing the same, placing the lithium secondary battery case inside a fixing member having an electromagnetic field generation means, and heating the metal electrode current collector using the electromagnetic field generation means, to heat-cure the composition for a gel polymer electrolyte.

13 Claims, 1 Drawing Sheet

(51) Int. Cl.
*H01M 10/0565* (2010.01)
*H05B 6/10* (2006.01)

(58) Field of Classification Search
CPC ........ H01M 2300/0085; H01M 10/052; H05B 6/105; H05B 6/10; Y02E 60/10; Y02P 70/50
USPC .......................................................... 264/403
See application file for complete search history.

(56) References Cited

U.S. PATENT DOCUMENTS

| | | | |
|---|---|---|---|
| 2012/0141880 | A1 | 6/2012 | Burgess et al. |
| 2016/0380302 | A1 | 12/2016 | Yun |
| 2017/0288255 | A1 | 10/2017 | Kim et al. |
| 2018/0123165 | A1 | 5/2018 | Park |
| 2018/0254522 | A1* | 9/2018 | Park .................. H01M 10/0525 |

FOREIGN PATENT DOCUMENTS

| | | |
|---|---|---|
| CN | 106299442 A | 1/2017 |
| CN | 106663835 A | 5/2017 |
| CN | 108242551 A | 7/2018 |
| EP | 3 327 852 A1 | 5/2018 |
| JP | 9-330740 A | 12/1997 |
| JP | 11-214038 A | 8/1999 |
| JP | 2001-283916 A | 10/2001 |
| JP | 2008-130453 A | 6/2008 |
| JP | 2013-140676 A | 7/2013 |
| KR | 10-2014-002655 A | 1/2014 |
| KR | 10-2016-0026346 A | 3/2016 |
| KR | 10-2017-0001358 A | 1/2017 |
| KR | 10-2017-0028730 A | 3/2017 |

OTHER PUBLICATIONS

Extended European Search Report dated Jan. 14, 2021, issued in corresponding European Patent Application No. 19810358.2.
Hyun-Soo Kim et al., "Electrochemical properties of poly(tetra ethylene glycol diacrylate)-based gel electrolytes for lithium-ion polymer batteries," Journal of Power Sources, Elsevier Science B.V., vol. 119-121, Jun. 1, 2003, pp. 482-486. XP004430218.
Office Action issued from the Chinese Patent Office dated Jan. 13, 2023, in corresponding Chinese Patent Application No. 201980006042.7.

* cited by examiner

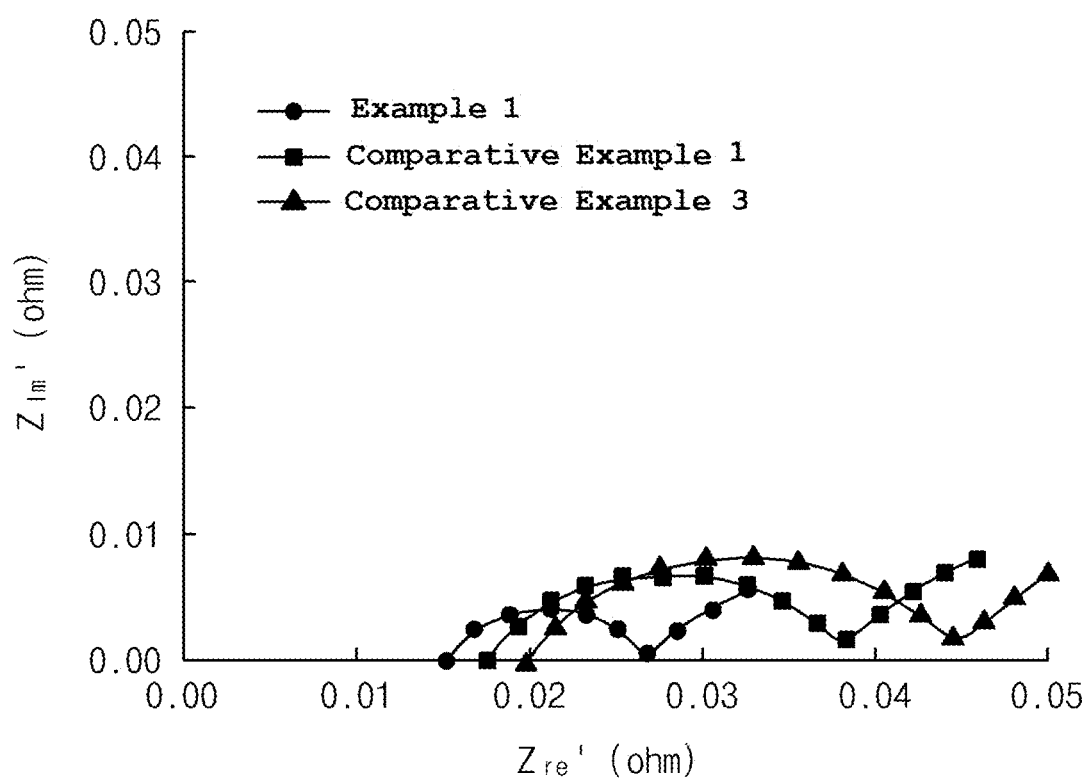

METHOD OF MANUFACTURING LITHIUM SECONDARY BATTERY WITH GEL POLYMER ELECTROLYTE

CROSS-REFERENCE TO RELATED APPLICATIONS

This application claims the benefit of Korean Patent Application No. 10-2018-0062561, filed on May 31, 2018, in the Korean Intellectual Property Office, the disclosure of which is incorporated herein in its entirety by reference.

TECHNICAL FIELD

The present invention relates to a method for manufacturing a lithium secondary battery, and more specifically, to a method for manufacturing a lithium secondary battery with improved battery performance and safety by using a fixing member having an electromagnetic field generation means to uniformly heat-cure a composition for a gel polymer electrolyte.

BACKGROUND ART

Recently, as the demand for portable electronic products such as laptops, video cameras, and portable phones has been rapidly increased and the development of electric vehicles, storage batteries for storing energy, robots, satellites, and the like has been in earnest, research on high performance secondary batteries capable of repetitive charging and discharging is actively being conducted. Currently, commercially available secondary batteries include nickel cadmium batteries, nickel hydrogen batteries, nickel zinc batteries, lithium secondary batteries, and the like. Among the above, lithium secondary batteries have little memory effect compared with nickel-based secondary batteries, and thus, are freely charged and discharged, have a very low self-discharge rate and a high energy density.

In a typical secondary battery, a liquid electrolyte, particularly, an ionic conductive organic liquid electrolyte in which a salt is dissolved in a non-aqueous organic solvent has been mainly used.

However, when a liquid electrolyte is used as described above, there are significant possibilities in that an electrode material is degenerated and an organic solvent is volatilized. In addition, there are safety issues such as combustion due to the temperature rise in a battery itself and the surroundings thereof. In particular, a lithium secondary battery has a problem in that the thickness of a battery is increased, during charging/discharging, due to the generation of gas inside the battery caused by the decomposition of a carbonate organic solvent and/or a side reaction between the organic solvent and an electrode. As a result, the deterioration in the performance and safety of the battery is inevitable.

On the other hand, a gel polymer electrolyte is excellent in electrochemical safety, and due to adhesion inherent in the gel, the adhesion between an electrode and the electrolyte is improved so that a thin-film battery may be manufactured. Therefore, a gel polymer electrolyte has been applied to various lithium secondary batteries in recent years.

Typical methods for forming a gel polymer electrolyte include solution casting, hot melting, in-situ cross-linking, and the like. Solution casting is a method in which a composition for an electrolyte is cast and then dried to be prepared in a film form, and there is a limitation in that a high boiling point solvent should be used in order to prevent an organic solvent from being volatilized during the drying process. Hot melting is a method in which a composition for an electrolyte in which a polymer is melted at a high temperature is film-cast and then cooled at room temperature, and there is a problem in an organic solvent having a low boiling point cannot be used since the polymer should be melted at a high temperature.

In-situ cross-linking is a method in which a composition for a gel polymer electrolyte including a polymer precursor capable of cross-linking such as an oligomer is injected into a battery case having an electrode assembly and then cured. In general, in order to heat-cure a composition for a gel polymer electrolyte, a method in which light or heat is applied directly to the outside of a case is used.

However, when a curing process is performed using a light emitting means or a heat generation means located near the outer side of the case, there is a problem in that a composition for a gel polymer electrolyte is not uniformly cured.

Accordingly, when manufacturing a liquid-injection-type lithium secondary battery, there is a need to develop a method for manufacturing a lithium secondary battery with improved battery capacity properties, lifespan properties, and safety by uniformly heat-curing a composition for a gel polymer electrolyte to reduce the interface resistance of the battery.

(Patent Document 1) Japanese Patent Laid-Open Publication No. 2008-130453

DISCLOSURE OF THE INVENTION

Technical Problem

An aspect of the present invention provides a method for manufacturing a lithium secondary battery with improved battery lifespan properties, capacity properties, and safety by uniformly heat-curing a composition for a gel polymer electrolyte to reduce the interface resistance of the battery.

Technical Solution

According to an aspect of the present invention, there is provided a method for manufacturing a lithium secondary battery, the method including injecting a composition for a gel polymer electrolyte into a lithium secondary battery case having an electrode assembly including a metal electrode current collector and then sealing the same, placing the lithium secondary battery case inside a fixing member having an electromagnetic field generation means, and heating the metal electrode current collector using the electromagnetic field generation means, to heat-cure the composition for a gel polymer electrolyte.

The electromagnetic field generation means may be an inductor including a winding coil.

Meanwhile, the fixing member may include an upper plate and a lower plate.

Also, at least one of the upper plate and the lower plate of the fixing member may move up and down.

At this time, the electromagnetic field generation means may be embedded inside at least one of the upper plate and the lower plate.

The electromagnetic field generation means may generate an induction current such that the metal electrode current collector is heated under a temperature condition of 30° C. to 150° C.

At least one of the upper plate and the lower plate may move up and down to apply pressure of 0.1 kgf/cm$^2$ to 1,000 kgf/cm$^2$ to the lithium secondary battery case.

Advantageous Effects

According to the manufacturing method of the present invention, an electromagnetic field generation means is used instead of direct heating means such that heat is not directly applied to the outside of a lithium secondary battery case but a metal current collector located inside the battery case is heated by an induction current to cure a composition for a gel polymer electrolyte. As a result, unlike a typical method in which heat is applied from the outside of a battery case, heat is uniformly transferred from the inside and the outside of an electrode assembly including the current collector to uniformly heat-cure the composition for a gel polymer electrolyte, thereby reducing interface resistance inside a battery and improving lifespan properties, capacity properties, and safety of the battery.

BRIEF DESCRIPTION OF THE DRAWING

FIG. 1 is a graph showing the results of measuring impedance resistance of a lithium secondary battery which were measured according to Experimental Example 1.

BEST MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A method for manufacturing a lithium secondary battery according to the present invention includes (1) injecting a composition for a gel polymer electrolyte into a lithium secondary battery case having an electrode assembly including a metal electrode current collector and then sealing the same, (2) placing the lithium secondary battery case inside a fixing member having an electromagnetic field generation means, and (3) heating the metal electrode current collector using the electromagnetic field generation means, to heat-cure the composition for a gel polymer electrolyte. Hereinafter, each step will be described in detail.

(1) Injecting Composition for Gel Polymer Electrolyte

First, a step of injecting a composition for a gel polymer electrolyte will be described. When a gel polymer electrolyte is used as an electrolyte of a lithium secondary battery, typically, a composition for a gel polymer electrolyte including a polymer precursor capable of cross-linking such as an oligomer is injected to form the gel polymer electrolyte.

First, an electrode assembly including a metal electrode current collector is inserted into a lithium secondary battery case, and then a composition for a gel polymer electrolyte is injected thereto.

The electrode assembly is a structure in which a positive electrode, a separator, and a negative electrode are sequentially laminated. Meanwhile, a positive electrode, a negative electrode, and a separator which are commonly used in the art may be used without particular limitation as the positive electrode, the negative electrode, and the separator.

For example, the positive electrode may be prepared by coating positive electrode active material slurry including a positive electrode active material, a binder, a conductive material, and a solvent on a metal positive electrode current collector.

The metal positive electrode current collector typically has a thickness of 3 μm to 500 μm. As long as the metal positive electrode current collector has conductivity without causing a chemical change in the battery, the kind thereof is not particularly limited. For example, stainless steel, aluminum, nickel, titanium, fired carbon, or aluminum or stainless steel that is surface-treated with one of carbon, nickel, titanium, silver, and the like may be used.

The positive electrode active material is a compound capable of reversible intercalation and de-intercalation of lithium, and specifically, may include a lithium composite metal oxide containing one or more metals such as cobalt, manganese, nickel or aluminum, and lithium. More specifically, the lithium composite metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y1}Mn_{Y1}O_2$ (wherein 0<Y1<1), $LiMn_{2-Z1}Ni_{Z1}O_4$ (wherein 0<Z1<2), etc.), a lithium-nickel-cobalt-based oxide (e.g., $LiNi_{1-Y2}Co_{Y2}O_2$ (wherein 0<Y2<1), etc.), a lithium-manganese-cobalt-based oxide (e.g., $LiCo_{1-Y3}Mn_{Y3}O_2$ (wherein 0<Y3<1), $LiMn_{2-Z2}Co_{Z2}O_4$ (wherein 0<Z2<2), etc.), a lithium-nickel-manganese-cobalt-based oxide (e.g., $Li(Ni_{p1}CO_{q1}Mn_{r1})O_2$ (wherein 0<p1<1, 0<q1<1, 0<r1<1, p1+q1+r1=1) or $Li(Ni_{p2}Co_{q2}Mn_{r2})O_4$ (wherein 0<p2<2, 0<q2<2, 0<r2<2, p2+q2+r2=2), etc.), or a lithium-nickel-cobalt-transition metal (M) oxide (e.g., $Li(Ni_{p3}Co_{q3}Mn_{r3}M_{s1})O_2$ (wherein M is selected from the group consisting of Al, Fe, V, Cr, Ti, Ta, Mg, and Mo, and p3, q3, r3, and s1 are each an atomic fraction of independent elements, wherein 0<p3<1, 0<q3<1, 0<r3<1, 0<s1<1, p3+q3+r3+s1=1) and the like, and any one thereof or a compound of two or more thereof may be included.

The binder is a component for assisting in coupling between an active material and a conductive material, and coupling to a current collector. Specifically, examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene (PE), polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a positive electrode active material. The conductive material is not particularly limited as long as it has conductivity without causing a chemical change in the battery. Examples of the conductive agent may include graphite; a carbon-based material such as carbon black, acetylene black, Ketjen black, channel black, furnace black, lamp black, and thermal black; a conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like. Specific examples of a commercially available conductive material may include acetylene black series (products of Chevron Chemical Company), Denka black (product of Denka Singapore Private Limited, Gulf Oil Company, etc.,), Ketjen black, EC series (product of Armak Company), Vulcan XC-72 (product of Cabot Company), and Super P (product of Timcal company).

The solvent may include an organic solvent such as N-methyl-2-pyrrolidone (NMP), and may be used in an amount such that a preferred viscosity is achieved when the positive electrode active material, and selectively, the binder and the conductive agent, and the like are included. For example, the solvent may be included in an amount such that the concentration of a solid including the positive electrode active material, and selectively the binder and the conductive material is 5 wt % to 70 wt %, preferably 10 wt % to 60 wt %, more preferably 15 wt % to 50 wt %.

The negative electrode may be prepared by coating negative electrode active material slurry including a negative electrode active material, a binder, a conductive material, and a solvent on a metal negative electrode current collector.

The metal negative electrode current collector typically has a thickness of 3 µm to 500 µm. The metal negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, as in the case of the positive electrode current collector, microscopic irregularities may be formed on the surface of the negative electrode current collector to improve the coupling force of a negative electrode active material, and the negative electrode current collector may be used in various forms of such as a film, a sheet, a foil, a net, a porous body, a foam body, and a non-woven fabric body.

Examples of the negative electrode active material may include one or two or more kinds of negative active materials selected from the group consisting of natural graphite, artificial graphite, a carbonaceous material; a metal (Me) such as a lithium-containing titanium composite oxide (LTO), Si, Sn, Li, Zn, Mg, Cd, Ce, Ni or Fe; an alloy composed of the metals (Me); an oxide ($MeO_x$) of the metal (Me); and a composite of the metal (Me) and carbon.

The descriptions of the binder, conductive material, and solvent are the same as those described above, and thus, detailed descriptions thereof will be omitted.

The separator is interposed between the positive electrode and the negative electrode, and an insulating thin film having high ion permeability and mechanical strength is used therefor. The pore diameter of the separator is typically 0.01 µm to 10 µm, and the thickness thereof is typically 5 µm to 300 µm. As for the separator, for example, a sheet or a non-woven fabric made of, for example, an olefinic polymer such as polypropylene which is chemically resistant and hydrophobic, glass fiber or polyethylene and the like is used.

At this time, in the case of the present invention, as an electrode current collector used in a positive electrode and/or a negative electrode, the metal electrode current collector having conductivity is used.

Typically, in order to heat-cure a composition for a gel polymer electrolyte, a method in which direct heating means are located outside a lithium secondary battery case and perform heating has been used. For example, a chamber which maintains a predetermined temperature condition has been used to heat the lithium secondary battery case.

However, the above method has a problem in that the heat-curing reaction of a composition for a gel polymer electrolyte proceeds from a portion adjacent to a direction in which heat is applied, so that the degree to which the composition for a gel polymer electrolyte is heat-cured in a lithium secondary battery varies, which hinders a gel polymer electrolyte from being uniformly formed.

Accordingly, in order to solve the above problem, the present inventors have devised a method in which a metal electrode current collector is heated with an induction current using an electromagnetic field generation means, which is to be described later, to heat-cure a composition for a gel polymer electrolyte. The electromagnetic field generation means does not generate heat itself, but may generate an induction current to heat a conductor (a body to be heated) through which the current flows. Accordingly, when the electromagnetic field generation means is provided in a fixing member for fixing a battery case, the metal electrode current collector which is a conductor is heated to uniformly heat-cure a composition for a gel polymer electrolyte inside the battery case.

At this time, in order to allow the induction current to flow, a metal electrode current collector is used as the electrode current collector, and as the metal electrode current collector, copper, stainless steel, aluminum, nickel, titanium, fired carbon, copper or stainless steel that is surface-treated with one of carbon, nickel, titanium, silver, and the like, an aluminum-cadmium alloy, and the like may be used. However, the embodiment of the present invention is not limited thereto. Any metal which is typically used as an electrode current collector may be used without particular limitation.

Meanwhile, various battery cases used in the art may be used as the lithium secondary battery case without limitation. However, it is preferable to use a pouch-type battery case which is not affected by the electromagnetic field.

The composition for a gel polymer electrolyte injected into the lithium secondary battery case includes a polymer precursor capable of cross-linking, a lithium salt, and a non-aqueous organic solvent. As the polymer precursor capable of cross-linking, a polymer precursor in the form of an oligomer commonly used in the art and the like may be used without limitation.

However, in the case of the present invention, since an electromagnetic field generation means is used to heat a metal current collector inside an electrode assembly to cure a composition for a gel polymer electrolyte, it is preferable to use a polymer precursor capable of cross-linking by a heat-curing method.

The lithium salt is used to impart ion conductivity, and specific examples thereof may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, a lower aliphatic carboxylic acid lithium, and the like.

As the non-aqueous organic solvent, for example, a non-protonic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy furan, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In addition, other additives may be further included for the purpose of improving charge and discharge properties and flame retardancy of the gel polymer electrolyte. For example, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride, and the like may be included. In some cases, a halogen-containing solvent such as carbon tetrachloride or ethylene trifluoride may be further included to impart non-flammability, or a carbon dioxide gas may be further included to improve high-temperature storage properties.

After the composition for a gel polymer electrolyte is injected, the lithium secondary battery case is sealed. Depending on the kind of a battery case, a sealing method may vary. For example, when a pouch-type battery case is used, the outer periphery of the battery case may be thermally fused to seal the battery case.

(2) Placing Lithium Secondary Battery Case Inside Fixing Member

Next, a step of placing the lithium secondary battery case will be described. Specifically, the step is a step of placing the lithium secondary battery case, into which the composition for a gel polymer electrolyte is injected, inside a fixing member having an electromagnetic field generation means.

The fixing member includes an upper plate and a lower plate.

At this time, the fixing member has an electromagnetic field generation means, and may be a member having an upper plate and a lower plate to simply fix the lithium secondary battery case, or may be a member configured such that at least one of the upper plate and the lower plate is movable up and down to apply pressure to the lithium secondary battery case. When the fixing member is configured to be able to apply pressure to the lithium secondary battery case, there are advantages in that gas generated during charging/discharging of a lithium secondary battery may be removed and a lithium secondary battery may be molded into a desired form to be manufactured.

For example, when at least one of the upper plate and the lower plate of the fixing member is moved up and down to apply pressure, pressure of 0.1 kgf/cm$^2$ to 1,000 kgf/cm$^2$, preferably 0.1 kgf/cm$^2$ to 500 kgf/cm$^2$, more preferably 0.1 kgf/cm$^2$ to 300 kgf/cm$^2$ may be applied to the lithium secondary battery case. The above range of pressure may vary depending on the kind and shape of a lithium secondary battery to be manufactured. However, when pressure of less than 0.1 kgf/cm$^2$ is applied, the fixing member and the lithium secondary battery case are not in sufficient contact with each other, so that heat is not easily transferred into a lithium secondary battery, which hinders effective heat generation. When pressure of greater than 1,000 kgf/cm$^2$ is applied, the lithium secondary battery may be physically damaged. Therefore, it is preferable that pressure in the above range is applied.

Specifically, placing the lithium secondary battery case inside the fixing member is to place the lithium secondary battery case between the upper plate and the lower plate constituting the fixing member.

Meanwhile, the electromagnetic field generation means provided in the fixing member is a means for inducing a conductor, which is a body to be heated, is heated itself, and uses an induction heating method using an electric magnetic field. In the present invention, a body to be heated is a metal electrode current collector, and the electromagnetic field generation means is not heated itself, but only the metal electrode current collector is heated.

More specifically, the electromagnetic field generation means may be an inductor including a winding coil. When an alternating current flows through the winding coil, an alternating magnetic field is formed. At this time, the alternating magnetic field is focused toward a body to be heated having a higher permeability, which indicates the degree to which a medium is magnetized for a given magnetic field. When the alternating magnetic field is focused toward the body to be heated, according to Faraday's law of induction, an eddy current is formed in the body to be heated. Due to the resistance of the eddy current and the body to be heated, joule heat is generated so that the electromagnetic field generation means itself is not heated, but only the metal electrode current collector, which is a body to be heated is heated.

The electromagnetic field generation means provided in the fixing member may be embedded in at least one of the upper plate and the lower plate. For example, when an inductor including a winding coil is used at the electromagnetic field generation means, the winding coil may be embedded inside the upper plate and/or the lower plate of the fixing member.

(3) Heat-Curing Composition for Gel Polymer Electrolyte

Next, a step of heat-curing a composition for a gel polymer electrolyte will be described. The electromagnetic field generation means located inside the fixing member is operated to heat the metal electrode current collector, thereby increasing the temperature inside a battery to heat-cure a composition for a gel polymer electrolyte.

In general, in order to manufacture a lithium secondary battery using a gel polymer electrolyte, a composition for a gel polymer electrolyte including a polymer precursor capable of cross-linking is cured using light or heat to be gelled.

Meanwhile, in the case of the present invention, since an electromagnetic field generation means is used to heat a metal current collector inside an electrode assembly to cure a composition for a gel polymer electrolyte, it is preferable to use a polymer precursor capable of cross-linking by a heat-curing method.

Among typical in-situ methods, when a heat-curing method is used, a composition for a gel polymer electrolyte is heated by a heat generation means located near the outer side of a battery case to be heat-cured.

However, since the composition for a gel polymer electrolyte includes a lithium salt, other cross-linking agents, an organic solvent and the like in addition to the polymer precursor, if a cross-linking reaction of the polymer precursor does not proceed uniformly inside a battery, the degree of cross-linking varies inside the battery, so that there may be a portion which is in sufficient contact with an interface of an electrode and/or a separator and a portion which is not. In the portion which is in sufficient contact, a charge transfer reaction of lithium ions actively occurs. However, in the portion which is not, it may be difficult for a charge transfer reaction to occur, so that the distribution of currents in an electrode becomes non-uniform and the performance of the battery may be deteriorated accordingly.

Therefore, when a gel polymer electrolyte is used to solve the above problem, in order to allow sufficient contact in a battery, particularly with an interface of an electrode or a separator, a metal electrode current collector is heated using an electromagnetic field generation means in the present invention.

Unlike when a composition for a gel polymer electrolyte is cured by being supplied with heat non-uniformly from a heat generation means located outside a battery case, when a composition for a gel polymer electrolyte is cured by heating a metal electrode current collector using an electromagnetic field, a gel polymer electrolyte is uniformly cured by being supplied with heat from the inside of a battery so that the gel polymer electrolyte is in sufficient contact with an interface of an electrode and/or a separator.

Meanwhile, the electromagnetic field generation means may generate an induction current such that the metal electrode current collector is heated to a temperature of 30° C. to 150° C., preferably 35° C. to 130° C., more preferably 40° C. to 120° C. The temperature may be appropriately adjusted in consideration of the type of a battery to be finally manufactured, the size of an electrode current collector, the number of stacks of electrodes in an electrode current collector, the capacity of the battery, and the like.

According to another embodiment of the present invention, a battery module including the lithium secondary battery, which is manufactured according to the method for manufacturing a lithium secondary battery, as a unit cell and a battery pack including the same are provided. The battery module and the battery pack include the lithium secondary battery having high capacity, high rate properties, and cycle properties, and thus may be used as a power source of a medium-and-large sized device selected from the group consisting of an electric vehicle, a hybrid electric vehicle, a plug-in hybrid electric vehicle, and a power storage system.

MODE FOR CARRYING OUT THE INVENTION

Hereinafter, the present invention will be described in more detail with reference to specific examples. However, the following examples are merely illustrative of the present invention and are not intended to limit the scope of the present invention. It will be apparent to those skilled in the art that various changes and modifications can be made without departing from the scope and spirit of the invention, and it is obvious that such variations and modifications are within the scope of the appended claims.

EXAMPLES

1. Example 1

94 wt % of $LiNi_{0.8}Co_{0.1}Mn_{0.1}O_2$ (NCM) which is a positive electrode active material, 3 wt % of carbon black which is a conductive material, and 3 wt % of polyvinylidene fluoride (PVDF) which is a binder were added to N-methyl-2-pyrrolidone (NMP) which is a solvent to prepare positive electrode active material slurry. The positive electrode active material slurry was applied to an aluminum (Al) thin film having a thickness of about 20 μm, which is a positive electrode current collector, dried and then roll pressed to manufacture a positive electrode.

96 wt % of carbon powder which is a negative electrode active material, 3 wt % of PVDF which is a binder, and 1 wt % of carbon black which is a conductive material were added to NMP which is a solvent to prepare negative electrode active material slurry. The negative electrode active material slurry was applied to a copper (Cu) thin film having a thickness of about 10 μm, which is a negative electrode current collector, dried and then roll pressed to manufacture a negative electrode.

94.99 g of an organic solvent in which 1 M of $LiPF_6$ is dissolved in ethylene carbonate (EC):ethyl methyl carbonate (EMC)=3:7 (volume ratio) was added with 5 g of a compound represented by Formula 1(n1=3) below and 0.01 g of dimethyl 2,2'-azobis(2-methylpropionate) (CAS No. 2589-57-3), which is a polymerization initiator, to prepare a composition for a gel polymer electrolyte.

[Formula 1]

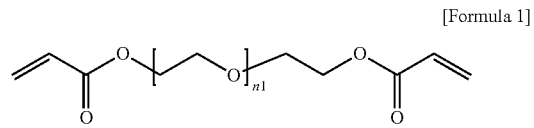

An electrode assembly (number of stack: 21) in which positive electrodes, 11 negative electrodes, and 22 separators composed of 3 layers of polypropylene/polyethylene/polypropylene are stacked in the order of separator/negative electrode/separator/positive electrode/separator was placed inside a battery case (thickness: 3.5 mm, longitudinal: 96 mm, transverse: 38 mm, capacity: 2 Ah) and then injected with the composition for a gel polymer electrolyte, and the battery case was sealed.

Thereafter, the battery case was placed between an upper plate and a lower plate of a jig having an inductor, and while operating the inductor to apply a current of 500 W for 5 hours so as to maintain the temperature of a battery at 60° C., a gel polymer electrolyte was cured to manufacture a lithium secondary battery.

2. Example 2

A lithium secondary battery was manufactured in the same manner as in Example 1 except that the inductor was operated to apply a current of 500 W for 5 hours while simultaneously applying pressure of 0.5 kgf/cm².

COMPARATIVE EXAMPLES

1. Comparative Example 1

A lithium secondary battery was manufactured in the same manner as in Example 1 except that the battery case injected with the composition for a gel polymer electrolyte and then sealed was stored in a chamber of a temperature of 60° C. for 5 hours to be heated so as to cure a gel polymer electrolyte.

2. Comparative Example 2

A lithium secondary battery was manufactured in the same manner as in Comparative Example 1 except that the battery case injected with the composition for a gel polymer electrolyte and then sealed was placed on a hot plate of a temperature of 60° C. and heated for 5 hours so as to cure a gel polymer electrolyte.

3. Comparative Example 3

A lithium secondary battery was manufactured in the same manner as in Comparative Example 2 except that the battery case injected with the composition for a gel polymer electrolyte and then sealed was placed on a hot plate of a temperature of 60° C. and heated for 5 hours while simultaneously applying pressure of 0.5 kgf/cm².

EXPERIMENTAL EXAMPLES

1. Experimental Example 1: Measurement of A.C. Impedance

The lithium secondary battery manufactured in each of Example 1 and Comparative Examples 1 and 3 was subjected to formation at a current of 200 mA (0.1 C rate), and then was subjected to CC/CV charge under the conditions of 4.2 V, 666 mA (0.33 C, 0.05 C cut-off) and CC discharge under the conditions of 3 V, 666 mA (0.33 C) three times. Thereafter, under the temperature condition of 25° C. and in the state of charge (SOC) of 50%, using a multi-impedance analyzer (Biologic Company, Model name: VMP3), A.C. Impedance resistance was measured in the range of 10 mHz to 100 kHz. The measured results are shown in FIG. 1.

As shown in FIG. 1, in the case of Example 1, it can be confirmed that the interface resistance was reduced compared with Comparative Examples 1 and 3. It is considered that this is because, in the case of example 1, a curing reaction of a gel polymer electrolyte occurred from inside the electrode assembly, so that the interface properties between an electrode and the gel polymer electrolyte constituting the electrode assembly are excellent.

2. Experimental Example 2: Measurement of Initial DC Resistance

The lithium secondary battery manufactured in each of Examples 1 and 2 and Comparative Examples 1 to 3 was subjected to formation at a current of 200 mA (0.1 C rate), and then was subjected to CC/CV charge under the conditions of 4.2 V, 666 mA (0.33 C, 0.05 C cut-off) and CC discharge under the conditions of 3 V, 666 mA (0.33 C) three times. Thereafter, a voltage drop occurred when a fully-charged lithium secondary battery was discharged for 10 seconds with a current of 5 A (2.5 C) was recorded, and an initial DC resistance value calculated using Ohm's Law (R=V/I) is shown in Table 1 below.

TABLE 1

|  | Initial DC resistance (Ohm) |
| --- | --- |
| Example 1 | 0.04 |
| Example 2 | 0.038 |
| Comparative Example 1 | 0.044 |
| Comparative Example 2 | 0.052 |
| Comparative Example 3 | 0.051 |

In the case of Examples, it can be confirmed that the initial DC resistance (interface resistance) of the lithium secondary battery is lower than that of Comparative Examples. It is considered that in the case of Comparative Examples, heat was applied from the outside of the lithium secondary battery case, so that the gel polymer electrolyte was not uniformly formed on the surface of the electrode, allowing the interface resistance to be higher than that of Examples.

3. Experimental Example 3: Evaluation of Room Temperature Lifespan Properties

The lithium secondary battery manufactured in each of Examples 1 and 2 and Comparative Examples 1 to 3 was subjected to formation at a current of 200 mA (0.1 C rate), and then was subjected to CC/CV charge under the conditions of 4.2 V, 666 mA (0.33 C, 0.05 C cut-off) and CC discharge under the conditions of 3 V, 666 mA (0.33 C) 50 times each at room temperature (25° C.). Thereafter, the first discharge capacity was set to an initial capacity and the 50th discharge capacity was compared with the initial capacity to calculate the capacity retention rate. The results are shown in Table 2.

TABLE 2

|  | Capacity retention rate (%) |
| --- | --- |
| Example 1 | 94 |
| Example 2 | 95 |
| Comparative Example 1 | 91 |
| Comparative Example 2 | 88 |
| Comparative Example 3 | 90 |

Referring to Table 2, in the case of Examples, the gel polymer electrode was stably formed on the electrode interface so that the interface properties of the gel polymer electrolyte were excellent. Therefore, it can be confirmed that an additional deterioration reaction was suppressed, thereby improving the capacity retention rate.

On the other hand, in the case of Comparative Examples, heat was applied from the outside of the battery case, so that the gel polymer electrolyte was not uniformly formed on the surface of the electrode, allowing the capacity retention rate to be relatively lower.

The invention claimed is:

1. A method for manufacturing a lithium secondary battery, the method comprising:
    injecting a composition for a gel polymer electrolyte into a lithium secondary battery case including an electrode assembly including a metal electrode current collector, and then sealing the lithium secondary battery case;
    placing the lithium secondary battery case inside a fixing member including an electromagnetic field generation means to generate an electromagnetic field; and
    heating the metal electrode current collector with induction heating using the electromagnetic field generated by the electromagnetic field generation means, to heat-cure the composition for a gel polymer electrolyte.

2. The method of claim 1, wherein the electromagnetic field generation means includes an inductor including a winding coil.

3. The method of claim 1, wherein the fixing member comprises:
    an upper plate; and
    a lower plate.

4. The method of claim 3, wherein at least one of the upper plate and the lower plate of the fixing member is movable in an up and down direction.

5. The method of claim 3, wherein the electromagnetic field generation means is embedded inside at least one of the upper plate and the lower plate.

6. The method of claim 1, wherein the electromagnetic field generation means generates an induction current, such that the metal electrode current collector is heated under a temperature condition of 30° C. to 150° C.

7. The method of claim 1, wherein the electromagnetic field generation means generates an induction current, such that the metal electrode current collector is heated under a temperature condition of 35° C. to 130° C.

8. The method of claim 1, wherein the electromagnetic field generation means generates an induction current, such that the metal electrode current collector is heated under a temperature condition of 40° C. to 120° C.

9. The method of claim 3, A method for manufacturing a lithium secondary battery, the method comprising:
   injecting a composition for a gel polymer electrolyte into a lithium secondary battery case including an electrode assembly including a metal electrode current collector, and then sealing the lithium secondary battery case;
   placing the lithium secondary battery case inside a fixing member, the fixing member including an upper plate, a lower plate, and an electromagnetic field generation means; and
   heating the metal electrode current collector using the electromagnetic field generation means, to heat-cure the composition for a gel polymer electrolyte, wherein at least one of the upper plate and the lower plate moves in an up and down direction to apply pressure of 0.1 kgf/cm$^2$ to 1,000 kgf/cm$^2$ to the lithium secondary battery case.

10. The method of claim 9, wherein the at least one of the upper plate and the lower plate moves in an up and down direction to apply pressure of 0.1 kgf/cm$^2$ to 500 kgf/cm$^2$ to the lithium secondary battery case.

11. The method of claim 1, wherein the electromagnetic field is an alternating magnetic field.

12. The method of claim 2, wherein the heating of the metal electrode current collector includes providing an alternating current through the winding coil to form an alternating magnetic field as the electromagnetic field.

13. The method of claim 1, wherein the heating of the metal electrode current collector includes heating the metal electrode current collector with induction heating using the electromagnetic field generated by the electromagnetic field generation means without heating the electromagnetic field generation means.

* * * * *

UNITED STATES PATENT AND TRADEMARK OFFICE
CERTIFICATE OF CORRECTION

| | |
|---|---|
| PATENT NO. | : 11,600,863 B2 |
| APPLICATION NO. | : 16/771133 |
| DATED | : March 7, 2023 |
| INVENTOR(S) | : Won Kyung Shin et al. |

It is certified that error appears in the above-identified patent and that said Letters Patent is hereby corrected as shown below:

On the Title Page

In item (72), the name of the fourth listed inventor "Chui Haeng Lee" should be corrected to
-- Chul Haeng Lee --.

Signed and Sealed this
Thirtieth Day of May, 2023

Katherine Kelly Vidal
*Director of the United States Patent and Trademark Office*